United States Patent
Speichinger

(10) Patent No.: US 10,119,455 B2
(45) Date of Patent: Nov. 6, 2018

(54) METHOD AND SYSTEM FOR DETECTING THERMOSTAT FAILURE IN AN ENGINE COOLING SYSTEM

(71) Applicant: Caterpillar Inc., Peoria, IL (US)

(72) Inventor: Jeffrey Joseph Speichinger, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 249 days.

(21) Appl. No.: 15/263,442

(22) Filed: Sep. 13, 2016

(65) Prior Publication Data

US 2018/0073423 A1   Mar. 15, 2018

(51) Int. Cl.
*F01P 11/16* (2006.01)
*G01M 15/04* (2006.01)

(52) U.S. Cl.
CPC .......... *F01P 11/16* (2013.01); *G01M 15/048* (2013.01); *F01P 2025/30* (2013.01); *F01P 2025/32* (2013.01); *F01P 2031/20* (2013.01)

(58) Field of Classification Search
CPC ........ F01P 11/14; F01P 11/16; F01P 2025/30; F01P 2025/32; F01P 2031/00; F01P 2031/20; G01M 15/048
USPC .............. 73/114.68; 123/41.15; 236/34.5, 94
See application file for complete search history.

(56) References Cited

U.S. PATENT DOCUMENTS

| | | | |
|---|---|---|---|
| 5,656,771 A * | 8/1997 | Beswick | F01P 11/14 340/449 |
| 6,681,619 B2 * | 1/2004 | Alleving | F01P 11/14 73/114.68 |
| 7,195,055 B1 * | 3/2007 | Jaeger | F01P 3/20 123/41.15 |
| 7,299,993 B2 | 11/2007 | Tsukamoto et al. | |
| 7,397,354 B1 | 7/2008 | Easton | |
| 8,370,052 B2 | 2/2013 | Lin et al. | |
| 9,146,176 B2 | 9/2015 | Nishi | |
| 9,217,689 B2 | 12/2015 | Rollinger et al. | |
| 2003/0110848 A1 | 6/2003 | Matsumoto et al. | |
| 2003/0131659 A1 * | 7/2003 | Oka | F01P 11/14 73/114.71 |
| 2004/0210361 A1 | 10/2004 | Na | |
| 2015/0088364 A1 | 3/2015 | Sakayori et al. | |
| 2015/0107345 A1 | 4/2015 | Sugimoto et al. | |

FOREIGN PATENT DOCUMENTS

| | | |
|---|---|---|
| CN | 105569803 | 5/2016 |
| JP | 2010127113 | 6/2010 |

* cited by examiner

*Primary Examiner* — Lisa Caputo
*Assistant Examiner* — Irving A Campbell
(74) *Attorney, Agent, or Firm* — Derek J. Somogy

(57) ABSTRACT

A method for thermostat failure detection in an engine cooling system is provided. The engine cooling system includes a coolant pump and a thermostat for providing a coolant flow between an engine and a radiator. The method includes determining one or more engine parameters. Further, a pressure difference between a coolant pump inlet pressure and a coolant pump outlet pressure is determined corresponding to the one or more engine parameters. The thermostat failure is detected when the determined pressure difference is outside a predefined range of pressure change defined corresponding to the determined one or more engine parameters.

18 Claims, 4 Drawing Sheets

METHOD AND SYSTEM FOR DETECTING THERMOSTAT FAILURE IN AN ENGINE COOLING SYSTEM

TECHNICAL FIELD

The present disclosure relates to an engine cooling system. More particularly, the present disclosure relates to a method and system for detecting a thermostat failure in the engine cooling system.

BACKGROUND

Engine cooling systems generally include a thermostat for regulating coolant flow between an engine and a radiator based on one or more engine parameters, such as, engine speed, coolant temperature, etc. Thermostat failure may result in irregular coolant flow between the engine and the radiator, which may cause excessive heating or excessive cooling of the engine.

Usually, thermostat failure is detected by monitoring temperature of the coolant flowing between the engine and the radiator. However, monitoring coolant temperature in warm and hot ambient conditions may not accurately detect thermostat failure.

U.S. Pat. No. 9,217,689 (hereinafter referred to as the '689 patent) relates to methods and systems for diagnosing each of a plurality of engine cooling components including various valves and grill shutters. Each valve may be individually closed and opened for a specified duration, and corresponding changes in coolant temperature are monitored. If all the components are functional, the various valves are adjusted to stagnate coolant at the engine and expedite engine warm-up during a cold start. However, '689 patent also uses coolant temperature to diagnose valves in the engine cooling system.

SUMMARY

According to one aspect of the present disclosure, a method for detecting thermostat failure in an engine cooling system is provided. The engine cooling system includes a coolant pump and a thermostat for providing a coolant flow between an engine and a radiator. The method includes determining one or more engine parameters. Further, a pressure difference between a coolant pump inlet pressure and a coolant pump outlet pressure is determined corresponding to the determined one or more engine parameters. The thermostat failure is detected when the determined pressure difference is outside a predefined range of pressure change.

According to another aspect of the present disclosure, a control system for detecting thermostat failure in an engine cooling system is provided. The engine cooling system includes a coolant pump and a thermostat for providing a coolant flow between an engine and a radiator. The control system includes a first pressure sensor associated with the coolant pump outlet and configured to monitor a coolant pump outlet pressure. The control system further includes a second pressure sensor associated with a coolant pump inlet and configured to monitor a coolant pump inlet pressure. The control system further includes a controller operatively coupled to the first pressure sensor and the second pressure sensor. The controller is configured to determine one or more engine parameters. The controller further determines a pressure difference between the coolant pump inlet pressure and the coolant pump outlet pressure corresponding to the determined one or more engine parameters. The controller further detects the thermostat failure when the determined pressure difference is outside a predefined range of pressure change.

According to a yet another embodiment of the present disclosure, an engine cooling system for an engine is provided herein. The engine cooling system includes a radiator, a coolant pump and a thermostat. The coolant pump is configured to circulate coolant through the engine and the radiator. The thermostat is configured to regulate coolant flow between the engine and the radiator based on one or more engine parameters. The engine cooling system further includes a control system having a first pressure sensor, a second pressure sensor and a controller. The first pressure sensor is associated with a coolant pump outlet and configured to monitor a coolant pump outlet pressure. The second pressure sensor is associated with a coolant pump inlet and configured to monitor coolant pump inlet pressure. The controller is operatively coupled to the first pressure sensor and the second pressure sensor. The controller is configured to determine one or more engine parameters. The controller further determines a pressure difference between the coolant pump outlet pressure and the coolant pump inlet pressure corresponding to the determined one or more engine parameters. The controller is configured to detect the thermostat failure when the determined pressure difference is outside a predefined range of pressure change defined corresponding to the determined one or more engine parameters.

DETAILED DESCRIPTION

Figure 1:
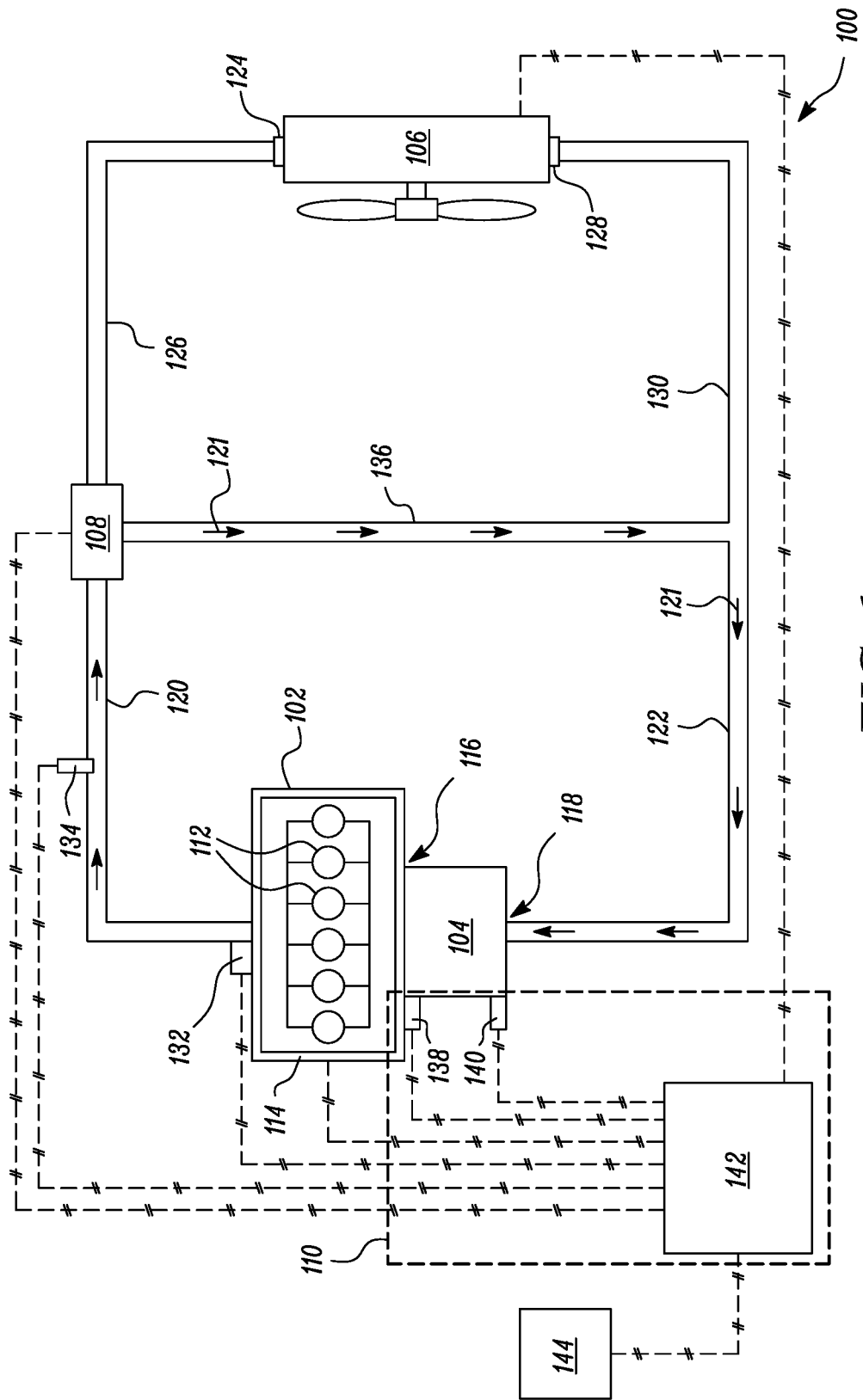
FIG. 1 illustrates schematic representation of an exemplary engine cooling system having a bypass flow for the coolant.
Figure 2:
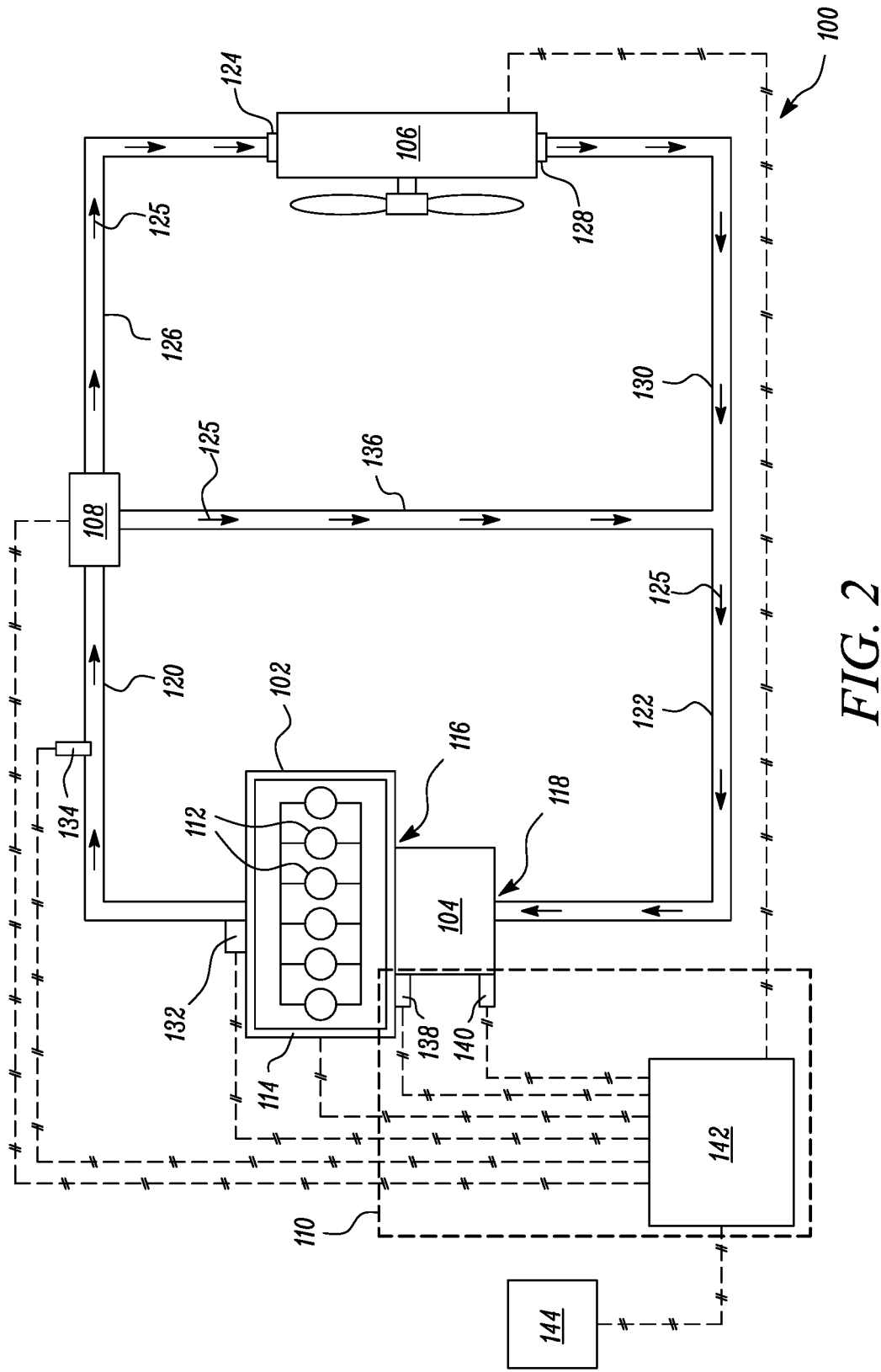
FIG. 2 illustrates the schematic representation of the engine cooling system having a parallel flow path for the coolant.
Figure 3:
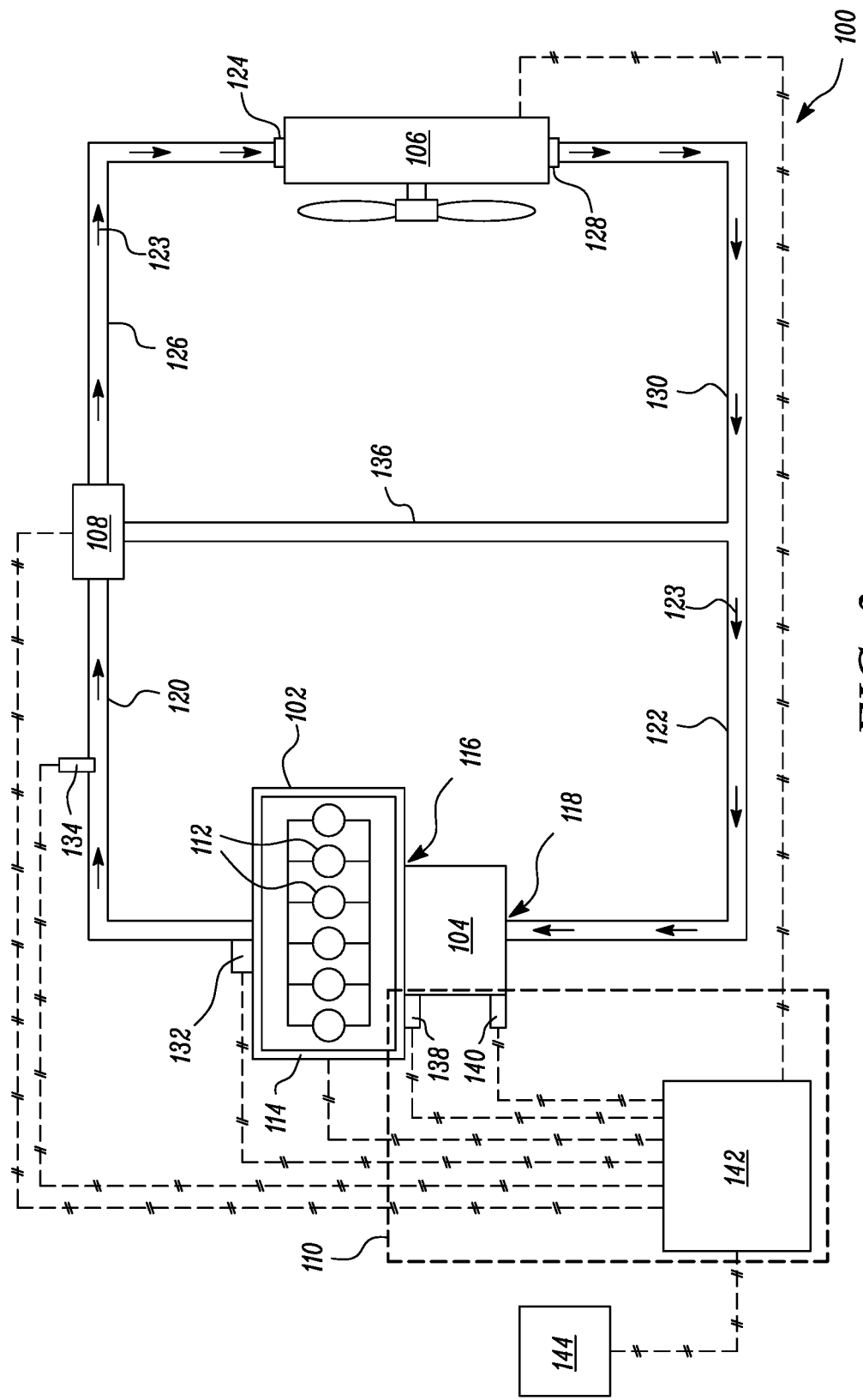
FIG. 3 illustrates the schematic representation of the engine cooling system having a radiator flow path for the coolant.

FIGS. 1 to 3 illustrate schematic representations of an exemplary engine cooling system 100 used for cooling an engine 102 of a machine (not shown). In various embodiments of the present disclosure, the engine cooling system 100 includes a coolant pump 104, a radiator 106 and a thermostat 108 that is configured to provide a regulated coolant flow between the engine 102 and the radiator 106. In an embodiment of the present disclosure, the engine cooling system 100 further includes a control system 110 configured to detect failure of the thermostat 108.

The engine 102 may be based on one of the commonly applied power-generation units, such as an internal combustion engine (ICE), a fuel cell, etc. Further, the engine 102 configurations may include a V-type engine configuration, an in-line engine configuration, or the like, as known conventionally.

The engine 102 includes a number of cylinders 112 defining combustion chambers therein. The combustion chamber receives a fuel or an air-fuel mixture that is ignited to execute a power stroke to generate desired power output for the machine. Combustion of the fuel or the air fuel mixture results in heat generation inside the engine 102.

The engine cooling system 100 is configured to dissipate the heat, generated in the engine 102, by circulating a coolant around the engine 102. The engine 102 may include an engine cooling jacket 114 having a number of coolant passages to facilitate coolant flow to cool down the engine 102 during operation.

A coolant pump outlet 116 is fluidly coupled to the engine cooling jacket 114 and configured to facilitate flow of the coolant through the engine cooling jacket 114. Further, the coolant exits from the engine 102 through an outlet conduit 120 positioned upstream of the engine 102. The coolant is circulated back to the coolant pump 104, for recirculation, through a coolant pump inlet 118 via an inlet conduit 122. The coolant may be circulated back to the coolant pump 104 via one or more of a radiator flow path or a bypass flow path, which are explained in greater details below.

At low coolant temperatures, the coolant flows through a bypass conduit 136, to the inlet conduit 122 and further to the coolant pump inlet 118. As shown by arrows 121 in FIG. 1, the outlet conduit 120, the bypass conduit 136 and the inlet conduit 122 are configured to define the bypass flow path for the coolant flow.

However, the radiator flow path for the coolant provides the coolant flow through the radiator 106 instead of the bypass conduit 136, as shown by arrows 123 in FIG. 3. The radiator 106 includes a radiator inlet 124 configured to be fluidly connected to the outlet conduit 120 via a first radiator conduit 126. The radiator 106 further includes a radiator outlet 128 configured to fluidly connect to the inlet conduit 122 via a second radiator conduit 130. The heated coolant from the outlet conduit 120 is configured to enter the radiator 106 via the radiator inlet 124. Further, the cooled down coolant is configured to exit the radiator 106 through the radiator outlet 128 and re-enter the coolant pump inlet 118 via the second radiator conduit 130 and the inlet conduit 122. The outlet conduit 120, the first radiator conduit 126, the radiator 106, the second radiator conduit 130 and the inlet conduit 122 define the radiator flow path for the coolant flow, as shown in FIG. 3.

The engine cooling system 100 further includes the thermostat 108 positioned at a junction connecting the outlet conduit 120, the bypass conduit 136 and the first radiator conduit 126. The thermostat 108 is configured to regulate flow of the coolant between the engine 102 and the radiator 106 based on one or more engine parameters such that the coolant flow follows either the bypass flow path and/or the radiator flow path. The engine parameters may include, for example, engine speed and coolant temperature. An engine speed sensor 132 associated with the engine 102 is configured to monitor the engine speed and a temperature sensor 134 positioned in the outlet conduit 120 is configured to monitor temperature of the coolant flowing out from the engine 102.

According to an embodiment of the present disclosure, the thermostat 108 may be in a first thermostat position, such as closed position, to facilitate coolant flow through the bypass conduit 136, thereby providing the bypass flow path for the coolant. The thermostat 108, in the closed position, blocks the coolant flow to the first radiator conduit 126 of the radiator 106. In an embodiment, the thermostat 108 may operate in the closed position when the coolant temperature in the outlet conduit 120 is below a first threshold temperature T1.

Further, the thermostat 108 may be in a second thermostat position, such as open position, to direct the coolant flow from the outlet conduit 120 to the inlet conduit 122 via the radiator 106, thereby blocking the coolant flow through the bypass conduit 136. In an embodiment, the thermostat 108 may operate in the open position when the temperature of the coolant is greater than a second threshold temperature T2. It may be contemplated that the second threshold temperature value T2 is greater than the first threshold temperature T1. Furthermore, the thermostat 108 is configured to transition between the closed position and the open position when the coolant temperature is greater than the first threshold temperature T1 and less than the second threshold temperature T2. The coolant follows both the bypass flow path and the radiator flow, thereby creating a parallel flow path, as shown by arrows 125 in FIG. 2, when the thermostat 108 transitions between the closed position and the open position.

It may be contemplated that the thermostat 108 may be any conventionally known thermostat that includes a valve element (not shown) having a thermally sensitive element, such as wax. The thermally sensitive element causes the valve element of the thermostat 108 to open and close based on the coolant temperature.

The engine cooling system 100 further includes the control system 110 for detecting failure of the thermostat 108. Detailed working of the control system 110 is explained in the following description. In an embodiment of the present disclosure, the control system 110 includes a first pressure sensor 138, a second pressure sensor 140 and a controller 142.

The first pressure sensor 138 is associated with the coolant pump outlet 116 and configured to monitor a coolant pump outlet pressure P1. The second pressure sensor 140 is associated with the coolant pump inlet 118 and configured to monitor a coolant pump inlet pressure P2. It may be contemplated that the first pressure sensor 138 and the second pressure sensor 140 may be any conventionally known pressure sensors capable of measuring fluid pressure.

The controller 142 is operatively coupled to the first pressure sensor 138, the second pressure sensor 140, the engine speed sensor 132, and the temperature sensor 134. According to an embodiment of the present disclosure, the controller 142 is configured to detect failure of the thermostat 108 based on inputs received from the engine speed sensor 132, the temperature sensor 134, the first pressure sensor 138 and the second pressure sensor 140.

The controller 142 is configured to determine the one or more engine parameters, such as engine speed and coolant temperature. For example, the controller 142 receives inputs from the engine speed sensor 132 and the temperature sensor 134 to determine the engine speed and the coolant temperature, respectively. Further, the controller 142 is configured to obtain the coolant pump outlet pressure P1 and the coolant pump inlet pressure P2 and determine a pressure difference ΔP between them. In an embodiment of the present disclosure, the determined pressure difference ΔP corresponds to determined engine speed and the temperature of the coolant flowing in the outlet conduit 120. It may be contemplated that for varying engine speed, the coolant pump inlet pressure P2 remains constant, whereas the coolant pump outlet pressure P1 changes based on the engine speed (because the coolant pump 104 is operated by the engine 102), thereby varying the pressure difference ΔP with the varying engine speed.

In an embodiment of the present disclosure, the controller 142 determines the pressure difference ΔP values corresponding to the various engine speeds monitored for a predefined coolant temperature range. For example, the coolant temperature ranges may include a first temperature range including temperature values less than the first threshold temperature T1, i.e., when the thermostat 108 is expected to be in the closed position. Further, a second coolant temperature range may include temperature values greater than the first threshold temperature T1 and less than the second threshold temperature T2, i.e., when the thermostat 108 is expected to be transitioning between the closed position and the open position. Furthermore, a third coolant temperature range may include temperature values greater than the second threshold temperature T2, i.e., when the thermostat 108 is expected to be in the open position. In such scenario, multiple pressure difference values ΔPs may be determined for multiple engine speeds determined during the corresponding predefined temperature ranges.

In an alternative embodiment, the controller 142 monitors the pressure difference ΔP at the determined particular engine speed and corresponding coolant temperature. For example, the engine speed may correspond to a specific coolant temperature which may indicate expected thermostat 108 operations. For example, one coolant temperature value may indicate that the thermostat 108 is expected to be in the closed position. Alternatively, the coolant temperature may be greater than T1 but less than T2, i.e., at which the thermostat 108 is expected to transition. Furthermore, the coolant temperature may be greater than the second threshold temperature T2 to indicate that the thermostat 108 is expected to be in the open state. Therefore, the pressure difference ΔP may be calculated corresponding to the particular engine speed and the coolant temperature.

The controller 142 is configured to compare the determined pressure difference ΔP with a predefined range of pressure difference and detect the thermostat 108 failure when the determined pressure difference is outside the predefined range of pressure difference defined corresponding to the determined engine speed and the coolant temperature.

In an embodiment, the predefined range of pressure difference is determined during normal operation of the thermostat 108 and may be pre-stored in the controller 142. For example, at the time of installation and/or testing of the normal functional thermostat 108, the pressure difference value(s), observed between the coolant pump outlet pressure P1 and the coolant pump inlet pressure P2 may be recorded for various engine speeds and corresponding temperature ranges where the thermostat 108 is expected to be in the closed position, in the open position and/or when the thermostat 108 is transitioning. Based on the recorded pressure difference value(s), a range, in the form of a curve, a map, or a look-up table, may be defined indicating a pattern that the pressure difference ΔP follows when the normally functional thermostat 108 is in the closed position, and/or the open position and/or when the thermostat 108 transitions between the closed position and the open position.

In an embodiment, the predefined range of pressure change may be defined for the various engine speeds and temperature ranges. For example, a predefined range of pressure differences may be recorded for various engine speeds corresponding to the coolant temperature range below the first threshold temperature T1, i.e., when the thermostat 108 should be in the closed position. Similarly, a predefined range of pressure differences may be recorded for various engine speeds corresponding to coolant temperature range greater than T1 but less than T2, i.e., when the thermostat 108 should be transitioning. Furthermore, another predefined range of pressure differences may be recorded for various engine speeds corresponding to the coolant temperature range greater than T2, i.e., when the thermostat 108 should be in the open position. Thus, the controller 142 may compare the determined pressure difference ΔP corresponding to the determined engine speed and the coolant temperature, with the predefined range of pressure difference defined corresponding to the determined engine speed and the coolant temperature.

In an embodiment of the present disclosure, the controller 142 detects the thermostat 108 failure when the determined pressure difference ΔP is outside the predefined range of pressure change defined for various engine speeds in the corresponding coolant temperature ranges. In an example, the controller 142 determines the engine speed and that the coolant temperature lies between T1 and T2, then the pressure difference ΔP monitored at the determined engine speed is compared to the predefined range of pressure change defined for corresponding engine speed and the coolant temperature range between T1 and T2, which would indicate that the thermostat 108 is expected to transition. Therefore, the controller 142 detects thermostat 108 failure when the determined pressure difference ΔP is outside the predefined range of pressure change defined corresponding to the determined engine speed and the coolant temperature range between T1 and T2.

In an embodiment of the present disclosure, the controller 142 is further configured to transmit a notification signal to a display device 144 communicatively coupled to the controller 142. It may be contemplated that the display device 144 is merely exemplary and may be varied without deviating from the scope of the claimed subject matter. The display device 144 may be a remotely located display device, such as that of a mobile handset, or a computer display or the like. Alternatively, the display device 144 may be positioned at an operator interface of a machine on which the engine cooling system 100 is employed. The notification signal may be in the form of a visual notification, a textual notification signal or the like.

INDUSTRIAL APPLICABILITY

Figure 4:
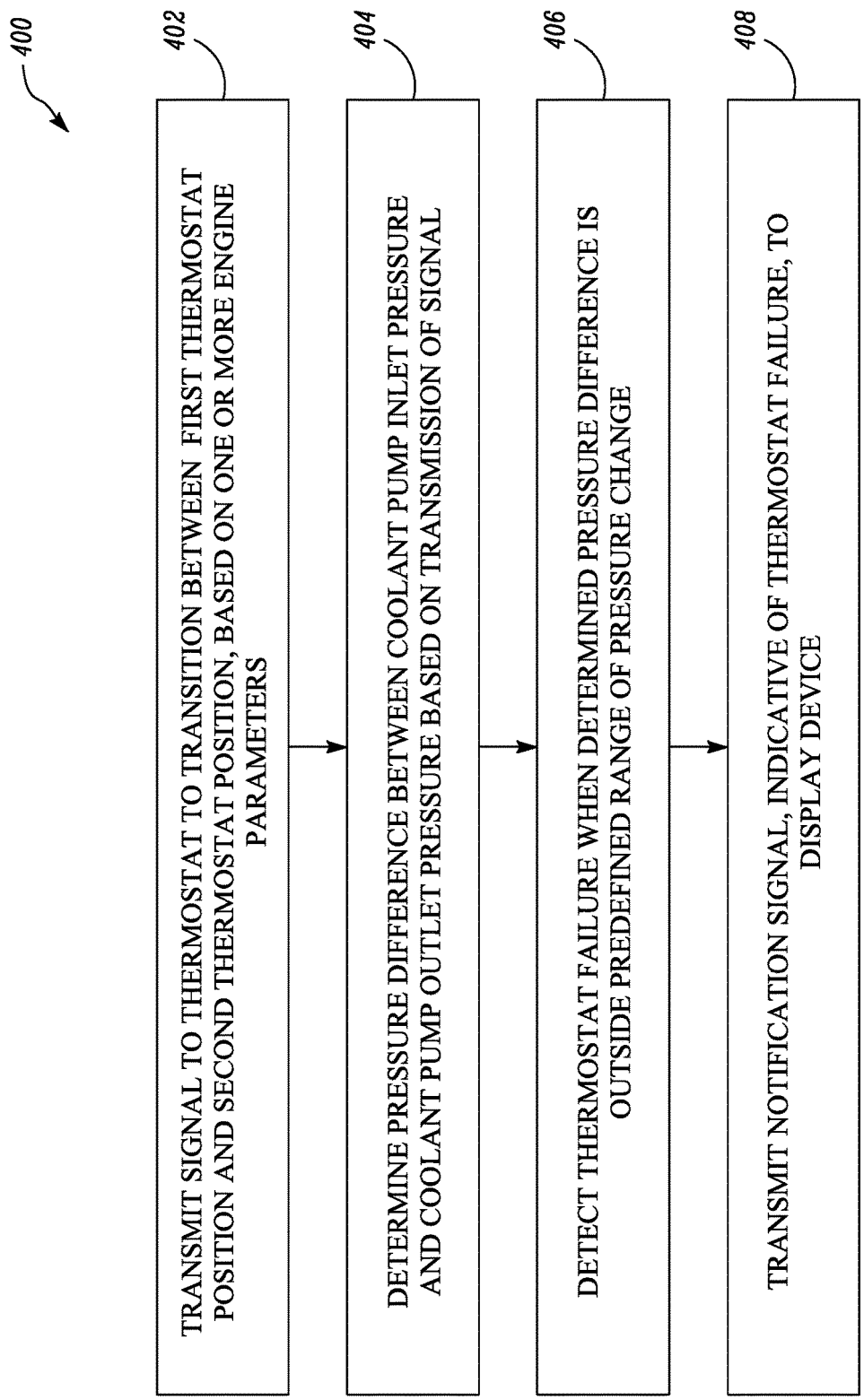
FIG. 4 illustrates an exemplary method for detecting thermostat failure in the engine cooling system.

FIG. 4 illustrates an exemplary method 400 for detecting failure of the thermostat 108 in the engine cooling system 100. In an embodiment of the present disclosure, the method 400 is performed at the controller 142 of the control system 110 in the engine cooling system 100.

At step 402, one or more engine parameters are determined. In an embodiment, the one or more engine parameters include engine speed and temperature of the coolant flowing out from the engine 102 in the outlet conduit 120. For example, the controller 142 receives inputs from the engine speed sensor 132 and the temperature sensor 134 to determine the engine speed and the coolant temperature.

At step 404, the pressure difference ΔP between the coolant pump outlet pressure P1 and the coolant pump inlet pressure P2 is determined corresponding to the determined one or more engine parameters. In an embodiment of the present disclosure, the pressure difference ΔP is determined for the determined engine speed and the coolant temperature. The coolant temperature may be indicative of the expected position of the thermostat 108.

At step 406, the thermostat 108 failure is detected when the determined pressure difference ΔP is outside the predefined range of pressure change defined for the corresponding engine speed and the coolant temperature. For example, the predefined range of pressure change is determined during normal operation of the thermostat 108. In an embodiment of the present disclosure, the predefined range of pressure change may be defined in the form of a curve or a map or a look-up table, which the normal functional thermostat 108 follows during its operation, i.e., when the thermostat 108 is in the closed position, in the open position and/or when the thermostat 108 transitions between the closed and the open position.

In an embodiment, the predefined range of pressure change may be defined for the multiple engine speeds and corresponding coolant temperature ranges. Therefore, when the determined pressure difference ΔP is not present at all or is outside the predefined range defined corresponding to the determined engine speed and the coolant temperature range in which the determined coolant temperature lies, then the thermostat 108 failure is detected. This means, that the determined coolant temperature and the engine speed may indicate that the thermostat 108 is expected to be in the closed position. Hence, the pressure difference should be within the predefined range defined for the engine speed and the corresponding coolant temperature in which the thermostat 108 should be in the closed position. However, since the pressure difference does not fall within the predefined range then there is a fault in the thermostat 108.

Furthermore, at step 408, a notification signal indicative of the thermostat 108 failure is transmitted to the display device 144. The display device 144 may be a remotely located display device or the like. Alternatively, the display device 144 may be positioned at an operator interface of a machine on which the engine cooling system 100 is employed. The notification signal may be in the form of a visual notification, a textual notification signal or the like.

The method 400 and the control system 110 according to the present disclosure, facilitate detection of thermostat 108 failure independent of ambient temperature conditions. The pressure change between the coolant pump inlet pressure P2 and the coolant pump outlet pressure P1 is independent of ambient temperature conditions and if at all it is not observed or is observed outside the predefined range, would indicate thermostat 108 failure. Therefore, corrective measures may be taken to either replace the faulty thermostat or service the faulty thermostat so as to avoid any damage to the engine 102 caused due to excessive heating.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the art that this disclosure can also be employed in a variety of other applications. Thus, the detailed description herein is presented for purposes of illustration only and not of limitation.

It may be further noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A method for detecting thermostat failure in an engine cooling system, the engine cooling system having a coolant pump and a thermostat for providing a coolant flow between an engine and a radiator, the method comprising:
   determining one or more engine parameters;
   determining a pressure difference between a coolant pump outlet pressure and a coolant pump inlet pressure corresponding to the determined one or more engine parameters; and
   detecting the thermostat failure when the determined pressure difference is outside a predefined range of pressure change defined corresponding to the determined one or more engine parameters.

2. The method as claimed in claim 1, wherein the one or more engine parameters include at least one of an engine speed and a coolant temperature.

3. The method as claimed in claim 2 further comprising:
   determining the pressure difference corresponding to an engine speed corresponding to a coolant temperature range; and
   detecting the thermostat failure when the pressure difference determined for a coolant temperature, falling within the coolant temperature range, is outside the predefined range of pressure change defined for the coolant temperature range.

4. The method as claimed in claim 1, wherein the predefined range of pressure change is determined during normal operation of the thermostat.

5. The method as claimed in claim 1, wherein the predefined range of pressure change is in the form of at least one of a curve, a map, or a look-up table.

6. The method as claimed in claim 1 further comprising transmitting a notification signal, indicative of the thermostat failure, to a display device.

7. A control system for detecting thermostat failure in an engine cooling system, the engine cooling system having a coolant pump and a thermostat for providing coolant flow between an engine and a radiator, the control system comprising:
   a first pressure sensor associated with a coolant pump outlet and configured to monitor a coolant pump outlet pressure;
   a second pressure sensor associated with a coolant pump inlet and configured to monitor a coolant pump inlet pressure; and
   a controller operatively coupled to the first pressure sensor and the second pressure sensor, the controller being configured to:
      determine one or more engine parameters;
      determine a pressure difference between the coolant pump outlet pressure and the coolant pump inlet pressure corresponding to the determined one or more engine parameters; and
      detect the thermostat failure when the determined pressure difference is outside a predefined range of pressure change defined for the determined one or more engine parameters.

8. The control system as claimed in claim 7, wherein the one or more engine parameters include at least one of engine speed or coolant temperature.

9. The control system as claimed in claim 8, wherein the controller is configured to:
   determine the pressure difference corresponding to an engine speed corresponding to a coolant temperature range; and
   detect the thermostat failure when the pressure difference determined for the coolant temperature, falling within the coolant temperature range, is outside the predefined range of pressure change defined for the coolant temperature range.

10. The control system as claimed in claim 7, wherein the predefined range of pressure change is determined during normal operation of the thermostat.

11. The control system as claimed in claim 7, wherein the predefined range of pressure change is in the form of at least one of a curve, a map, or a look-up table.

12. The control system as claimed in claim 7, wherein the controller is further configured to transmit a notification signal, indicative of the thermostat failure, to a display device.

13. An engine cooling system for an engine, the engine cooling system comprising:
   a radiator;
   a coolant pump configured to circulate coolant through the engine and the radiator;
   a thermostat configured to regulate coolant flow between the engine and the radiator based on one or more engine parameters; and
   a control system comprising:
      a first pressure sensor associated with a coolant pump outlet and configured to monitor a coolant pump outlet pressure;
      a second pressure sensor associated with a coolant pump inlet and configured to monitor a coolant pump inlet pressure; and
      a controller operatively coupled to the first pressure sensor and the second pressure sensor, the controller being configured to:
         determine one or more engine parameters;
         determine a pressure difference between the coolant pump outlet pressure and the coolant pump inlet pressure corresponding to the determined one or more engine parameters; and
         detect the thermostat failure when the determined pressure difference is outside a predefined range of pressure change defined for the determined one or more engine parameters.

14. The engine cooling system as claimed in claim 13, wherein the one or more engine parameters include at least one of engine speed or coolant temperature.

15. The engine cooling system as claimed in claim 14, wherein the controller is configured to:
   determine the pressure difference corresponding to an engine speed corresponding to a coolant temperature range; and
   detect the thermostat failure when the pressure difference determined for the coolant temperature, falling within the coolant temperature range, is outside the predefined range of pressure change defined for the coolant temperature range.

16. The engine cooling system as claimed in claim 13, wherein the predefined range of pressure change is determined during normal operation of the thermostat.

17. The engine cooling system as claimed in claim 13, wherein the predefined range of pressure change is in the form of at least one of a curve, a map, or a look-up table.

18. The engine cooling system as claimed in claim 13, wherein the controller is further configured to transmit a notification signal, indicative of the thermostat failure, to a display device.

* * * * *